US009302180B2

(12) United States Patent
Ziemkowski et al.

(10) Patent No.: US 9,302,180 B2
(45) Date of Patent: Apr. 5, 2016

(54) LASER MAZE

(76) Inventors: Ted Ziemkowski, Windsor, CO (US);
Chris Corman, Windsor, CO (US)

( * ) Notice: Subject to any disclaimer, the term of this patent is extended or adjusted under 35 U.S.C. 154(b) by 35 days.

(21) Appl. No.: 11/748,405

(22) Filed: May 14, 2007

(65) Prior Publication Data

US 2007/0265071 A1    Nov. 15, 2007

Related U.S. Application Data

(60) Provisional application No. 60/800,157, filed on May 15, 2006.

(51) Int. Cl.
*A63F 9/24* (2006.01)
*A63F 13/30* (2014.01)
*A63F 13/20* (2014.01)

(52) U.S. Cl.
CPC .............. *A63F 13/12* (2013.01); *A63F 13/06* (2013.01)

(58) Field of Classification Search
USPC ............... 463/30, 31, 34, 7, 8, 10; 273/237
See application file for complete search history.

(56) References Cited

U.S. PATENT DOCUMENTS

| 4,285,517 | A | * | 8/1981 | Morrison ........................... 463/9 |
| 4,672,215 | A | | 6/1987 | Howard |
| 4,763,903 | A | | 8/1988 | Goodwin et al. |
| 5,083,271 | A | | 1/1992 | Thacher et al. |
| 5,762,503 | A | * | 6/1998 | Hoo et al. ..................... 434/237 |
| 6,594,043 | B1 | * | 7/2003 | Bloom et al. ................... 398/15 |
| 6,795,455 | B2 | * | 9/2004 | Scheps ............................. 372/21 |
| 6,918,845 | B2 | | 7/2005 | Kudla |
| 2004/0008936 | A1 | * | 1/2004 | Giboney et al. .................. 385/37 |
| 2004/0080107 | A1 | * | 4/2004 | Triplette ....................... 273/237 |
| 2005/0140930 | A1 | | 6/2005 | Dvorkis et al. |
| 2006/0229843 | A1 | * | 10/2006 | Freifeld ......................... 702/178 |

OTHER PUBLICATIONS

UC Davis Optics Club, 4 pages, archived online at http://web.archives.org/web/20051203012721/opticsclub.engineering.ucdavis.edu/lazermaze.html, UC Davis Optics Club, 4 pages, archive date Mar. 12, 2005.*
http://www.bostonpartymakers.com/performers/inflatables.htm, Boston Party Makers, 16 pages, date of photograph on p. 11 is Oct. 12, 2002.*
"Lazer Maze", http://web.archive.org/web/20030612211548/http://laserchaser.com/, Jun. 12, 2003, retrieved Feb. 9, 2010.
"What's New", Playmeter Magazine, p. 43, Dec. 2002.
"Short Takes", Funworld Magazine, p. 47, Feb. 2003.
Laser Maze, http://web.archieve.org/web/20041208215118/www.laserchaser.com/browse.php?frm_category=82, Dec. 8, 2004, World Wide Web.

* cited by examiner

*Primary Examiner* — Paul A D'Agostino
*Assistant Examiner* — Brandon Gray
(74) *Attorney, Agent, or Firm* — Krajec Patent Offices, LLC; Russell Krajec

(57) ABSTRACT

A laser maze attraction has a series of lasers and sensors that may be configured in a maze where a user may be timed for completing the maze, but with penalties for breaking a laser beam. A controller may illuminate a plurality of lasers and monitor sensors corresponding to each of the lasers. The controller may also calculate an elapsed time and deduct a penalty for any laser beam that is broken. A customer interface may include a timer, various buttons arranged in the maze, and other devices that may be actuated during the timed event.

20 Claims, 6 Drawing Sheets

LASER MAZE

CROSS REFERENCE TO RELATED APPLICATIONS

This application claims priority to and benefit of U.S. Provisional Patent Application Ser. No. 60/800,157, filed May 15, 2006 by Ted Ziemkowski entitle "Laser trapped, Timed, Challenge Attraction", the entire contents of which are hereby expressly incorporated by reference.

BACKGROUND

Amusement attractions are entertaining and sometimes challenging games that bring out competitive and excited emotions from users. Haunted houses, laser tag games, and various arcade games and simulators are typical of the sort.

A successful attraction may appeal to a potential user by being relatively easy to understand, but offer a challenge to the user. Lights, sounds, and other effects may be used to interest a potential user and draw the user to the attraction.

From the operator's standpoint, a successful attraction may also be durable, easy to operate, and reliable. Durability may be a factor in attractions where a user is navigating an obstacle course, running, jumping, or otherwise moving.

SUMMARY

A laser maze attraction has a series of lasers and sensors that may be configured in a maze with laser beam obstructions and where a user may be timed for completing the maze, but with penalties for breaking a laser beam. A controller may illuminate a plurality of lasers and monitor sensors corresponding to each of the lasers. The controller may also calculate an elapsed time and deduct a penalty for any laser beam that is broken. A customer interface may include a timer, various buttons arranged in the maze, and other devices that may be actuated during the timed event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
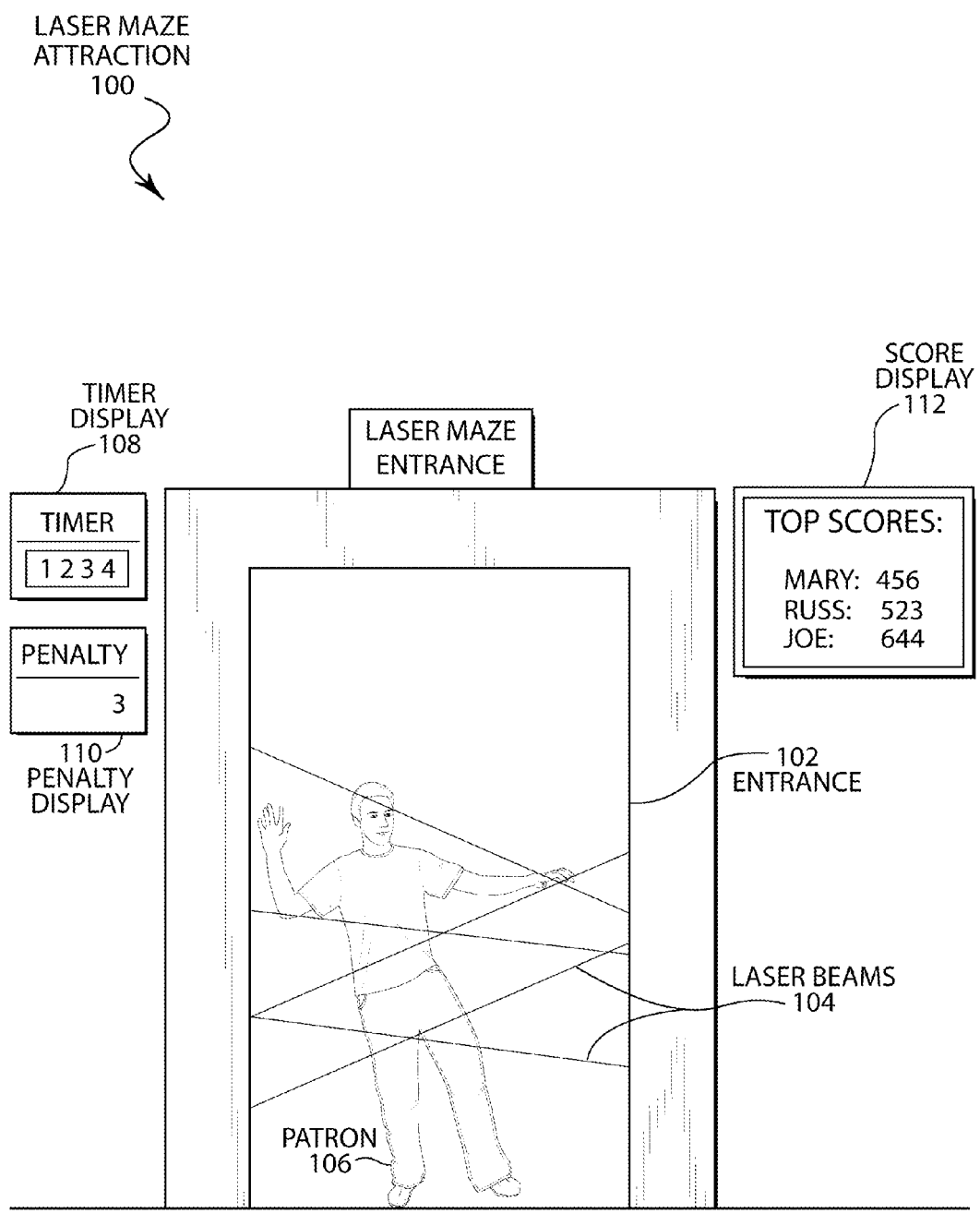
FIG. 1 is a diagram of an embodiment showing a laser maze attraction.

A laser maze may have several lasers that are oriented across a pathway. A patron may attempt to pass through the maze and may have penalties assessed for breaking a laser beam. In many embodiments, a laser maze may be a circular or linear course with an entry and exit and sensors or buttons arranged to start and stop a timer.

The laser maze may be incorporated into other attractions, such as embodiments that may have a laser tag, puzzle solution, or other game component. In some embodiments, the laser maze may be a timed event where each patron's score is individually calculated and compared to that of other patrons. Other embodiments may enable two or more patrons to compete against each other or interact with each other.

A laser maze may have several lasers that are positioned to be received by a sensor. In some embodiments, one or more mirrors may be used to reflect the laser beam across the patron's pathway. A controller may illuminate the lasers using various inputs and may be configured to turn off a laser then the beam has been broken. In some embodiments, two or more different sets of lasers may be illuminated in an installation to give two or more different challenges to a patron.

The laser maze may compute a score for a patron based on a time to traverse the maze plus a penalty for any laser beams that were tripped or broken. The score calculation may encourage a patron to quickly pass through the maze, but with the tradeoff of being careful not to trip a laser beam.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a laser maze attraction. A laser maze attraction may have a series of laser beams that are oriented across a path which a patron attempts to follow without breaking the laser beams. Each laser may direct a beam to a sensor that can detect if the beam has been broken. The attraction may be operated so that the patron receives a score that is a combination of the time required to navigate the path with a penalty for each beam that is broken. Other effects, such as lights, sounds, and motions may be added to the attraction and may be caused to operate with certain events or when a laser beam is tripped.

The embodiment 100 shows an entrance 102 to a laser maze having several laser beams 104 and a patron 106 attempting to navigate the laser maze. The laser beams 104 may be oriented in any manner within the laser maze in order to produce obstructions to the path of the patron 106. In many embodiments, a fog generator may be used to make the laser beams visible to the patron 106.

The laser beams 104 may be oriented so that the patron may step across the beams, duck under the beams, slide to the side of a beam, crawl underneath, or otherwise contort and slither through the maze.

A timer display 108 may indicate a time or score based on the time the patron takes to traverse the path. In some instances, the timer may use real time indicator, such as counting minutes and seconds. In other instances, the timer may use a non-real time indicator, such as a number of processor counts or other time indicator.

A penalty display 110 may indicate the number of broken laser beams or a penalty associated with the number of broken laser beams. Each embodiment may have a different method for assessing a penalty for broken or tripped laser beams. Some embodiments may calculate a final score that incorporates the patron's time and any penalty for tripped laser beams. For example, a score calculator may include the patron's time in seconds plus a ten second penalty time for each laser beam that is broken.

Some embodiments may use different colored lasers, with each color having a different penalty assigned. For example, green and red lasers may be present, with red lasers having a 10 second penalty for each broken beam while assessing a 5 second penalty for breaking a green laser beam.

In some embodiments, a graduated penalty may be calculated. For example, when one beam is broken, a 10 second penalty may be added to the score but when two beams are broken, a 15 second penalty may be assessed.

In other embodiments, a score may be determined using the configuration of the laser maze. For example, some lasers in certain portions of a maze may have higher penalties than other lasers. The number of methods for calculating a score using a combination of time and tripped laser beams is infinite and may vary with the designer of a maze.

Some embodiments may combine a time and penalty for broken laser beams into a single score for each attempt by a patron. In other embodiments, the score and penalty may be tracked and recorded separately to yield a two-part score.

A score display 112 may be updated to show various data about patron scores for the attraction. In some cases, the top scores may be shown with a patron's identification. In other cases, the last several scores may be listed. The display 112 may also be used to display the rules of the attraction, how a score is calculated, advertisements for the attraction or other items, camera views of a patron in the maze, real time score for the current patron, or other information. In many cases, the display 112 may change from one screen to another showing top scores, recent scores, or other information.

In some embodiments, some or all of the timer display 108, the penalty display 110, and the score display 112 may be visible to patrons standing in line to use the attraction or may be visible to the patron 106 who is traversing the maze.

Some embodiments may have several different configurations of laser beams that may be used to obstruct a path. For example, an easy version of a maze may have a subset of the entire set of lasers operational, while a difficult version of the same maze may have the entire set of lasers illuminated. Different point values or scores may be assessed for each version of the game.

Some embodiments may have different sets of lasers operational to create a different challenge for each patron. In an example of such embodiments, each patron may be challenged with one of three subsets of laser beams. Another example may illuminate a random set of lasers so that each traversal of the maze is a different experience or challenge for the patron.

The laser maze may include additional challenges of mind or skill as part of the attraction. For example, a patron may traverse a portion of a maze then encounter a puzzle or other challenge to solve. After solving the puzzle, the patron may traverse another section of the maze or move to another interactive element of the maze.

In some embodiments, the laser maze may be coupled with other elements involving other patrons. For example, a laser maze may be installed as a minefield or challenge within a laser tag or paintball competition arena. In such an embodiment, multiple patrons may be armed with a laser gun and receiver vests or paintball guns and seek out and shoot other patrons, play capture the flag, or other contests. Such embodiments may group patrons into teams or may be an individual contest.

A laser maze may be installed in a particular area of the play zone as a challenge to negotiate. For example, in a capture the flag contest, a laser maze may be installed in a passageway through which a patron may negotiate to reach the competitor's flag. Such an installation may calculate a penalty score for tripping a laser beam in determining an eventual winner of the contest. Additionally, tripping a laser beam may trigger a noisemaker, lights, or cause some other event to occur that alerts patrons that someone is attempting to capture a flag.

Some embodiments may be designed so that two or more patrons may traverse a single maze together. Other embodiments may allow two patrons to simultaneously race each other in similar but separate mazes. In some embodiments, a two person maze may include two separate buttons at a point in the maze. The buttons may be placed a distance apart from each other so that one patron cannot reach both buttons. As part of the maze, both buttons may be pressed simultaneously to indicate that the two patrons had completed a section of the maze.

A laser may be controlled such that when the laser beam is broken, the laser is turned off. By turning off a laser when the beam is broken, a patron may be protected from having a laser beam shine directly into the patron's eye. Further, the patron will be instantly notified that the beam has been broken. In other embodiments, a laser may flash or pulsate when the beam is initially broken and may turn off completely when the beam is broken for an extended period of time. In still other embodiments, a tripped laser may be displayed at a low power setting. Some embodiments may actuate a noisemaker, light, movement actuator, or other device when a laser is broken.

In some embodiments, a laser may stay illuminated or may pulse when the beam is initially broken. In such an embodiment, a small penalty may be assessed for breaking a beam for a short period but a larger penalty may be assessed for breaking a beam for a longer period.

Some embodiments may determine that a laser beam is broken when a sensor device receives a signal below a specific threshold. Other embodiments may be constructed so that the signal strength received by the sensor may be used to determine a penalty. For example, when a patron brushes up against a laser beam, the laser beam may be partially blocked but not completely blocked. The sensor may be calibrated to sense the partial blocking. The partially blocked beam may be used to assess a partial penalty, illuminate a warning signal, cause the beam to pulsate, or perform some other action.

Figure 2:
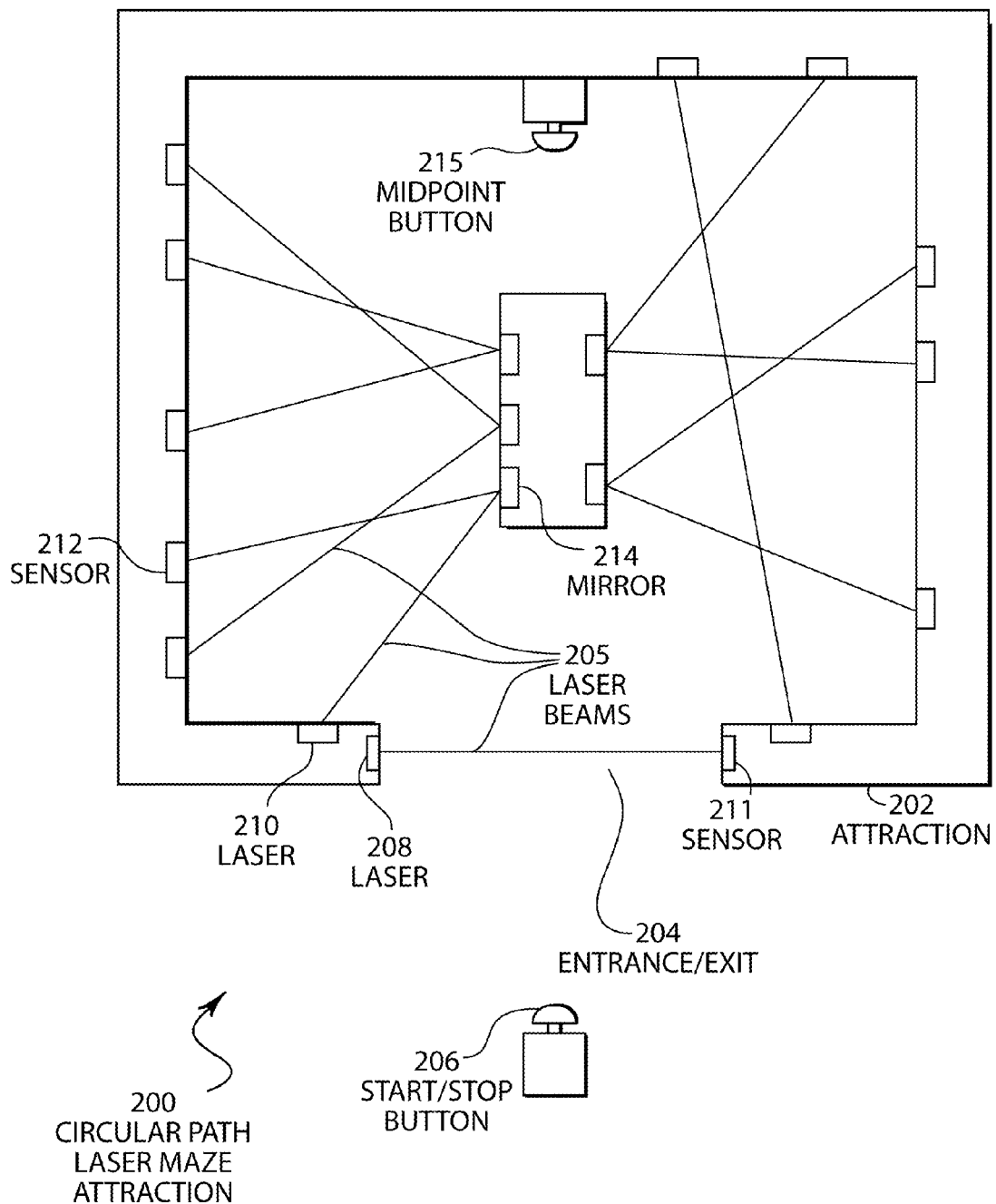
FIG. 2 is a plan view diagram of an embodiment showing a circular laser maze.

FIG. 2 is a plan view of an embodiment 200 showing a laser maze attraction with a circular pathway.

The laser maze attraction 202 has a combined entrance and exit 204. A start/stop button 206 may be used to start and stop a timer. A patron may press the start button 206, traverse the maze, press the midpoint button 215, traverse the maze again, and press the start/stop button 206 to finish the maze.

A laser maze attraction may be configured on any type of path, including circular paths having a combined entrance and exit, serpentine or tortuous paths having a separate entrance and exit, straight paths, or any other shaped path. In such paths, lasers may be oriented in any position that may provide a partial obstacle to the path. Lasers may be positioned to force a patron to twist, crawl, step over, duck under, or otherwise maneuver around the laser beams.

A laser 208 and sensor 211 may form one of the laser beams 205 across the entrance/exit 204 of the attraction 200. Another laser 210 may form two beams by bouncing from the laser 210 to the mirror 214 and to the sensor 212. Other embodiments may use mirrors, prisms, beam splitters, or other devices to create different beam configurations and effects.

In many attractions, laser beams may be turned on in sequence. For example, a patron may progress through a portion of a maze path to a first point, have their presence sensed by a sensor, and have additional lasers illuminated ahead in the path.

Another type of sequence may be for one, two, or more lasers to be turned on and off for a designated time. For example, three lasers beams may be mounted as sequential obstacles across a path. The three laser beams may be sequenced so that the first beam turns off, then the second, then the third, allowing a patron to pass through the sequence of laser beams. In some such embodiments, the laser beams may turn on in the same sequence, and the process may be repeated. Such an embodiment may act as a gauntlet, enabling a patron to pass by following the sequence of laser beams.

In some cases, one or more laser beams may be turned on or off when another laser beam is tripped. For example, after breaking a first beam, additional laser beams may be turned on to provide additional obstacles, while other lasers may be turned off. Each attraction may use different logic to provide different challenges to a patron.

The various lasers, sensors, and mirrors may be mounted in the attraction 202 in many useful manner. In some cases, the various components may be rigidly mounted in a wall of an attraction. In other cases, one or more of the components may be mounted using a stand, mounted in a scenery object, or some other mounting mechanism.

Figure 3:
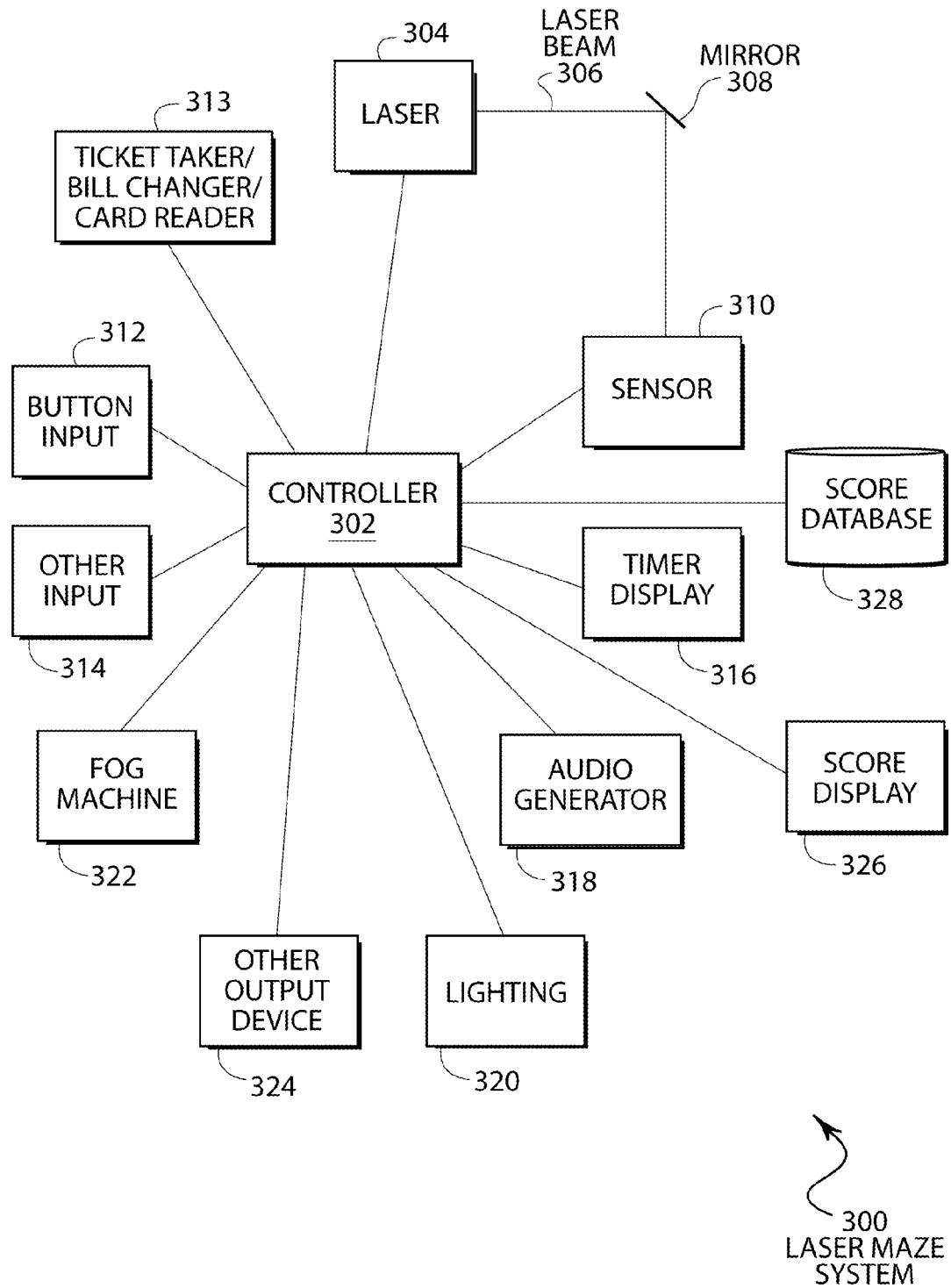
FIG. 3 is a diagram of an embodiment showing the functional portions of a laser maze system.

FIG. 3 is a diagram of an embodiment 300 showing various components that make up a laser maze system. A centralized controller 302 may perform many operations for a laser maze attraction.

The controller 302 may control multiple lasers 304 that produce a laser beam 306. The laser beam 306 may be reflected by one or more mirrors 306 and received by a sensor 310. The controller 302 may be able to turn the laser 304 on and off and receive a signal from the sensor 310.

In some embodiments, the controller 302 may be able to cause the laser 304 to pulsate, operate in sequence with other lasers, adjust intensity, or cause other changes in the laser output.

The controller 302 may be able to receive a signal from the sensor 310 to determine if the laser beam 306 has been broken. In some instances, the signal from the sensor 310 may be an on/off or single bit digital signal, while in other instances, the signal may be an analog signal or a multi-bit digital signal that has multiple values.

When a controller 302 may receive an analog or variable signal from a sensor 310, the controller 302 may be able to process the signal using a threshold to determine if the beam is broken or not. In some cases, a variable signal may be used to calculate penalties based on how much of the beam has been broken, in contrast to other cases where a penalty is assessed when the beam is completely broken.

The controller 302 may use various other inputs, such as a button input 312 or other inputs 314 to perform various actions such as starting and stopping timers, sequencing the game play, and other functions. In some cases, various inputs may be used to turn on and off the laser 304.

The controller 302 may produce various outputs to control various devices. During gameplay and after a patron has completed traversing the attraction, a timer display 316 may show a current score, a top time, or other information relating to a game in progress or a recently completed game.

Before, during, and after gameplay, various other output devices may be actuated. For example, an audio generator 318 may play noises or sounds continually. Additionally, special sounds may be played when a laser beam is broken or in response to other events, such as starting or stopping a game, achieving a high score, or some other event. Similarly, a lighting device 320 may be actuated in response to various inputs.

Other output devices 324 may include mechanical actuators, air jets, or any other controllable device. The controller 302 may be able to control any output device using any type of input.

The controller 302 may have various input and output devices for capturing and displaying information about patrons. In some cases, a patron's score may be captured, and tracked. Various input devices may be used to identify a particular patron. For example, a keyboard or other input device may be used to type a patron's name, alias, or other identifier.

In another example, a patron may be issued a wristband with a barcode identifier that is stored in a score database 328. When the patron uses the attraction, a barcode scanner may scan the wristband and the controller 302 may store the patron's score in the score database 328.

The controller 302 may be able to calculate a score for each use of an attraction. A history of scores may be stored in the score database 328, which may be used to determine a ranking of scores over a period of time.

In some embodiments, a contest may be held wherein a prize may be awarded for the best score over a period of time. Each patron's scores may be stored in the score database 328 and a winner may be determined over a period of time. In some instances, the period of time may be a single day or afternoon, while other instances may track scores over a period of days, weeks, or months to determine a champion.

The score database 328 may be stored in a nonvolatile memory system such as a hard disk. In some instances, the score database 328 may be located through a network connection, such as on a remote server that may be connected through the Internet.

For the purposes of this specification and the claims, a controller may be a single processor controller or a combination of multiple processors. In some cases, a portion of the functions of a controller may be performed by one processor, programmable logic device, gate array, logic device, state machine, ladder logic controller, personal computer, microprocessor, hardwired logic device, or other controller element while their functions are performed by a different controller element. For example, a personal computer may be used to perform some functions such as a user interface or network connectivity while another controller element with a separate processor performs the laser control and sensing functions. The 'controller' as used in this specification and claims may be of any architecture adapted to perform the functions described. Any reference to a controller architecture is for illustrative purposes and is not meant to be limiting.

Figure 4:
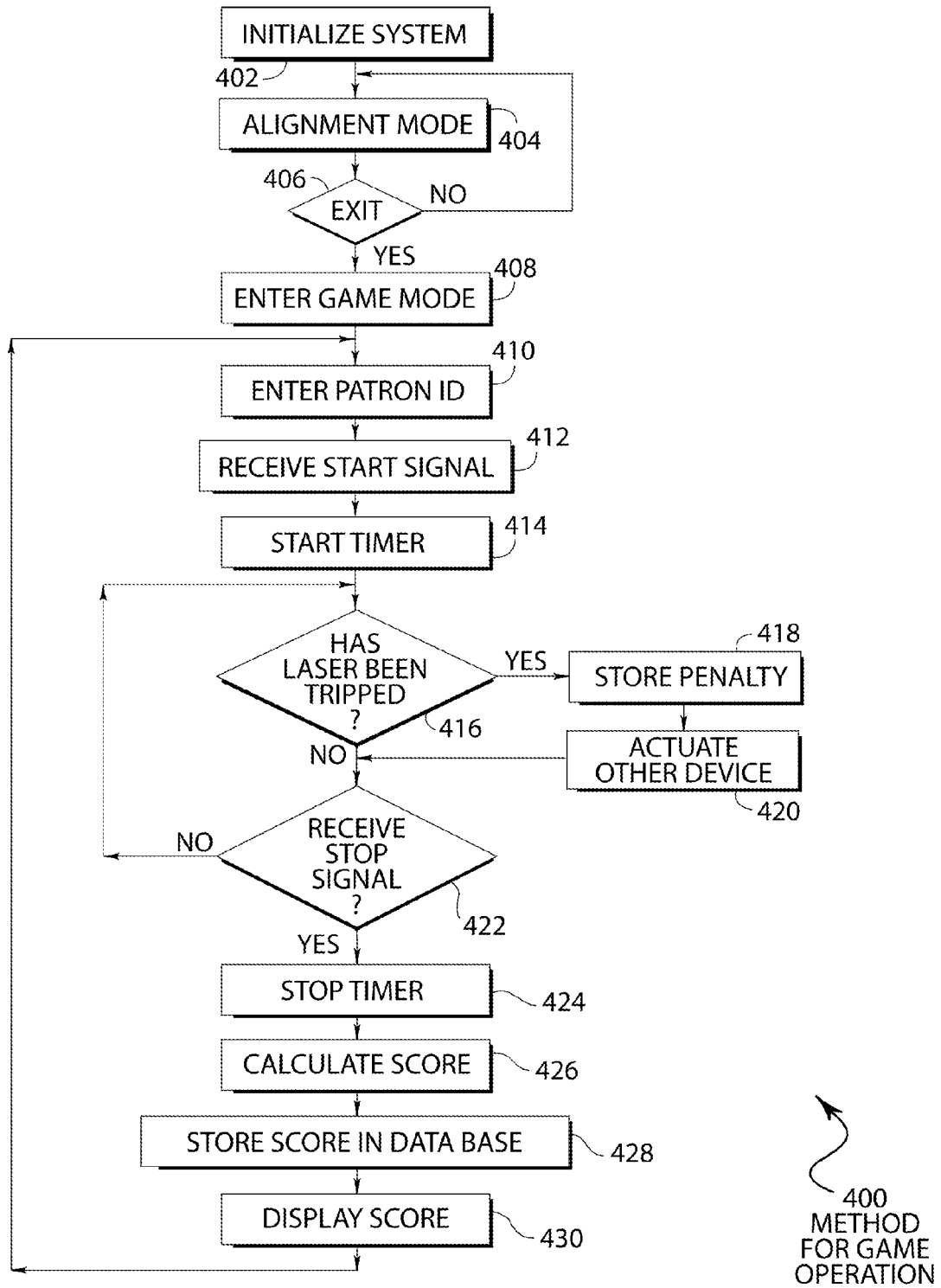
FIG. 4 is a flowchart illustration of an embodiment showing a method for game operation.

FIG. 4 is a flowchart illustration of an embodiment 400 showing a method for game operation. The method illustrates an alignment mode and a game mode.

The system is initialized in block 402 and may enter an alignment mode in block 404. In an alignment mode, each laser may be illuminated and may enable a technician to align a laser beam to strike a sensor. During alignment mode, the controller may keep the lasers illuminated even when the sensor does not receive a signal. The alignment mode may also include a display that may indicate whether each sensor is picking up a signal and may also indicate the signal strength in some embodiments. Such a display may be also used as a top score display during normal operation. Another embodiment of such a display may include LED or other indicators near the sensors or in some other location such as LEDs located on a controller board used for electrical connections.

In some embodiments, alignment mode may be entered automatically during an initialization phase. The alignment mode may be used to verify that each sensor is receiving a signal from the proper laser and that the lasers, mirrors, beam splitters, or other optical component are properly aligned so that the laser beam reaches the sensor.

In other embodiments, alignment mode may be a form of a maintenance mode of a controller. Alignment mode may be entered by using a special code, key switch, or other input signal that may be controlled by a technician. In some embodiments, alignment mode may be entered by pressing a switch or actuating a button in an electrical cabinet or a secret or inaccessible location so that patrons do not have access.

The game mode is entered in block 408.

A patron identification may be entered in block 410. In some embodiments, the patron identification may be added after the patron has finished the maze, while in other embodiments, the identification may be entered prior to entering the maze.

The patron may be identified using any type of device and in any manner. In some embodiments, a computer terminal with a display and keyboard may be used to enter a patron's identification. When a database is used with the attraction, a returning patron's identification may be selected from previous entries in the database.

In some instances, a patron's identification may be entered into a database prior to a first use of the laser maze. A patron may then select their identification from the available patron identifiers in the database.

A patron's identification may be any unique identifier. For example, an email address, name, social security number, alias, personal identification number, or any other identifier may be used, depending on the embodiment.

A start signal is received in block 412 and a timer is started in block 414. The start signal may be any input that may be used to start a timer. In the embodiment 200, a start/stop button may be used to initiate the timer. Such a button may be pressed by a patron or by an attraction operator. Other input devices, such as a sensor, may also be used to sense the patron's presence in a designated area and begin the timer.

The timer may use real time, such as minutes and seconds, to count up or down while a patron traverses the maze. Other embodiments may use a timer that does not count in real time but uses processor counts or some other timing mechanism.

While the timer is running, a patron may be attempting to navigate the laser maze and avoid tripping any laser beams. If a laser beam has been tripped in block 416, a penalty may be stored in block 418 and another device may be activated in block 420.

A penalty may be determined in many different ways. In a less complex example, each tripped laser beam may result in a single penalty. When a score is computed, the score may be adjusted based on the number of penalties. In more complex embodiments, different penalties may be assessed for different actions. For example, breaking a beam of one color may be assessed a different penalty than breaking a beam of a different color. Many variations of penalties and calculating penalties may be used.

When a laser beam is tripped, another device may be activated in block 420. For example, an air jet may be fired in the direction of the patron, a noise may be played, or a light may be flashed. In some embodiments, a mechanical actuator may be actuated to move a prop or other device within the maze.

In some embodiments, tripping a laser may change the gameplay by illuminating or turning off some lasers. For example, tripping one laser may cause another laser to be illuminated in the path of a patron, adding to the difficulty. In another example, tripping a specific laser beam may cause other lasers to turn off, lowering the difficulty and possibly lowering the potential score a patron may achieve, depending on how a score may be calculated.

If a stop signal is received in block 422, the timer is stopped in block 424, otherwise the process loops back to block 416. A stop signal may be any type of input device or sensor that is used to stop the gameplay. In the embodiment 200, the start/stop button may be pressed by a patron upon exiting the attraction to stop the timer.

After the timer is stopped in block 424, a score may be calculated in block 426. The score may be calculated in any manner. In some instances, a score may consist of a time plus any penalties for tripping laser beams. In such an instance, a lower score may be more desirable than a high score. In other instances, a score may consist of a time plus a separate variable for penalties.

In still other instances, a score may be computed based on time, difficulty, which laser beams were tripped, and other inputs, such as a score for completing a puzzle or some other variable input. In some cases, a score computation may make a higher score more desirable than a low score.

The score may be stored in a database in block 428 along with the patron identification. In some embodiments, the database may be volatile and may be reset when the attraction is reset. In other embodiments, the database may be nonvolatile and may be stored on a hard disk or a remote computer or server.

The score may be displayed in block 430. In some embodiments, a score may be displayed with other scores, such as a top three list, the last several patron's scores, or the last several scores for the patron. The scores may be displayed in many different manners on many different types of displays.

Figure 5:
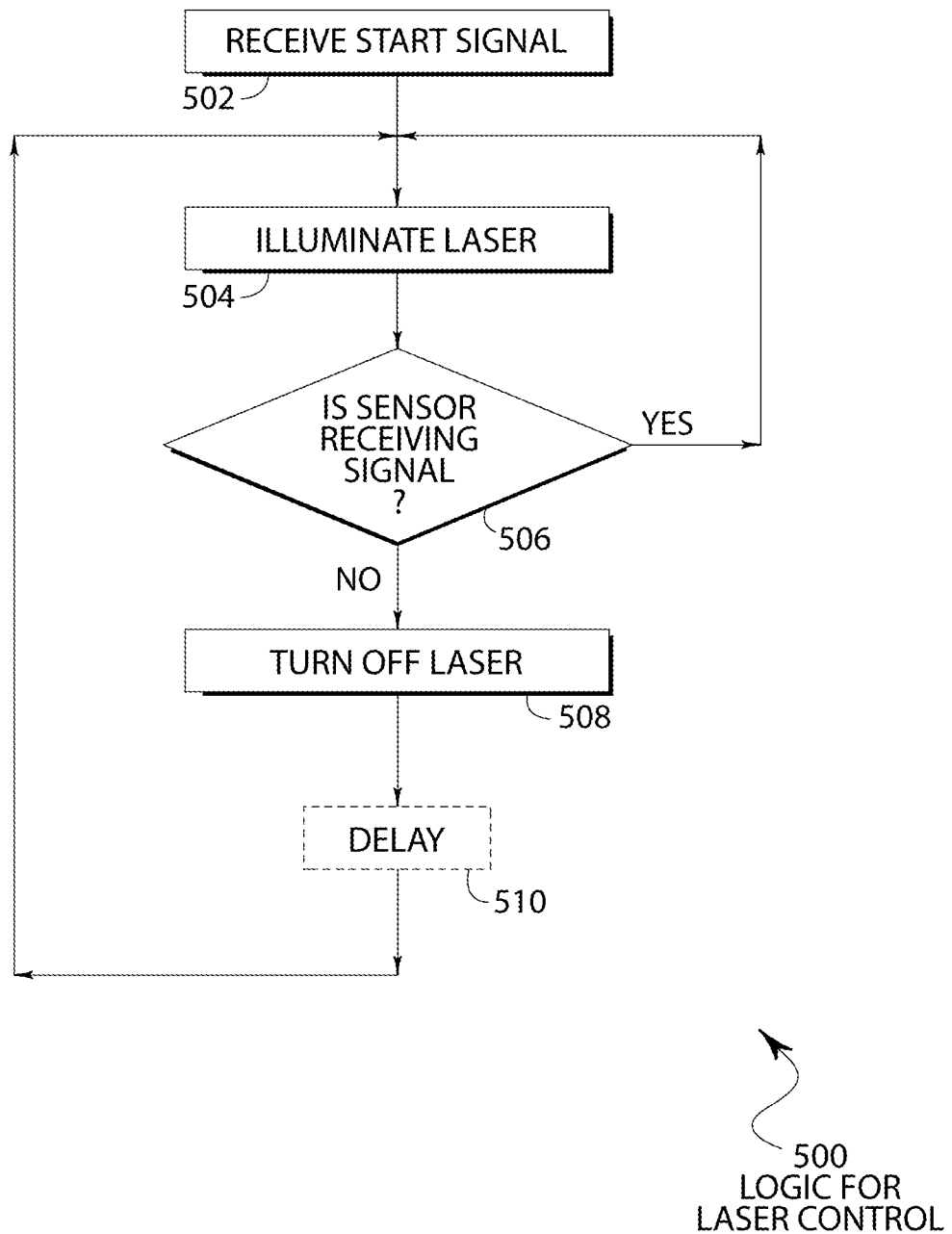
FIG. 5 is a flowchart illustration of an embodiment showing a logic for laser control.

FIG. 5 is a flowchart illustration of an embodiment 500 showing a method for controlling a laser during a game mode of a laser maze.

After receiving a start signal in block 502, the laser is illuminated in block 504. While a sensor is receiving the laser beam and generating a signal in block 506, the process loops. When the sensor stops receiving a signal in block 506, the laser is turned off in block 508.

Embodiment 500 illustrates a logic that may be employed to control a laser. The logic has several features. First, because the laser may be shut down immediately when the beam is interrupted, any damage to the eye of a patron may be prevented. Second, the visible disappearance of the laser beam may indicate to the patron that the beam has been tripped and that the patron incurred a possible penalty.

Figure 6:
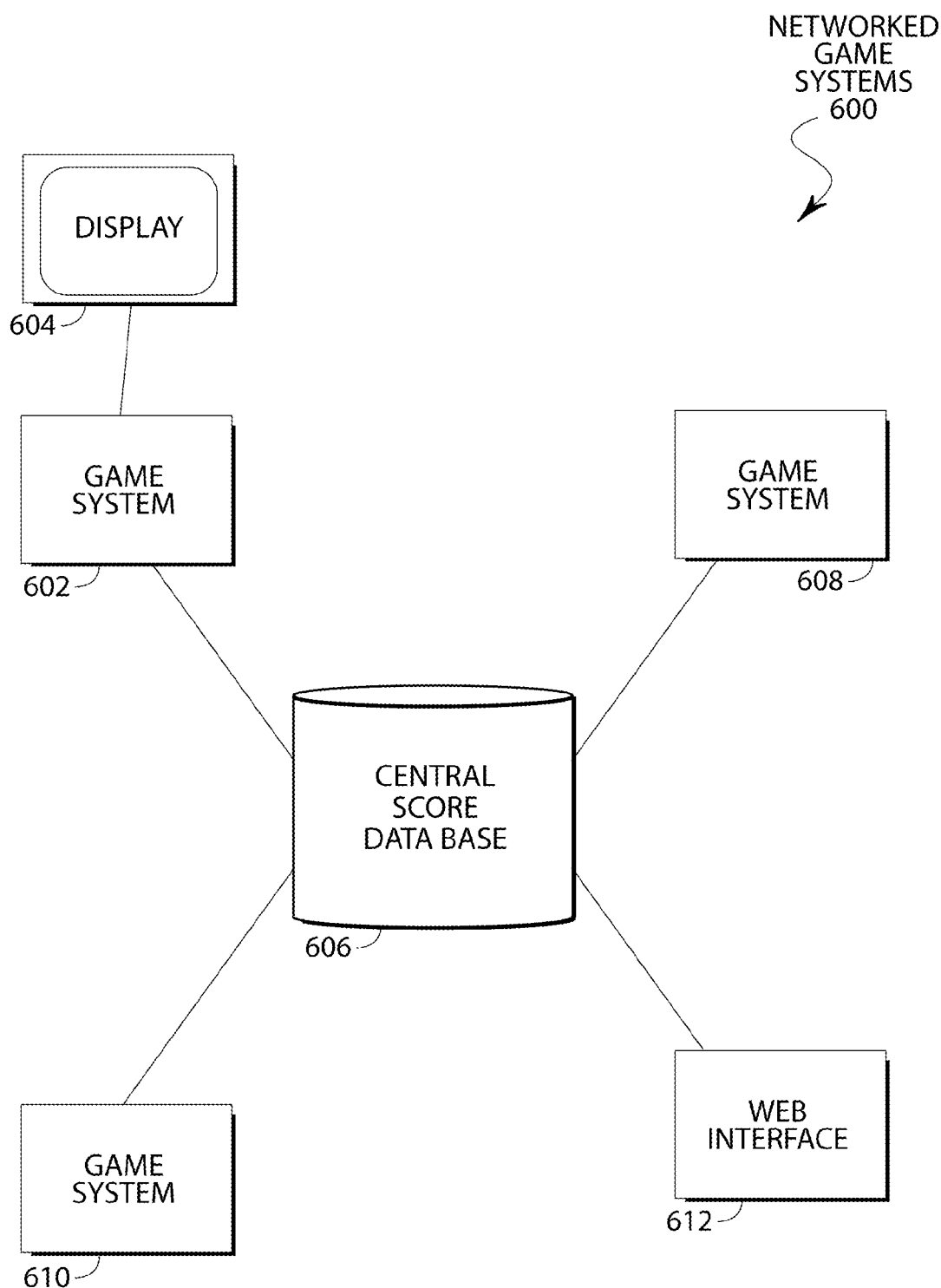
FIG. 6 is a diagram of an embodiment showing a networked system of the game systems.

FIG. 6 is a diagram of an embodiment 600 showing a networked set of game systems. A game system 602 may have a display 604 and may be connected to a central score database 606. Other game systems 608 and 610 may also be connected to the central score database 606.

Each game system 602, 608, and 610 may be capable of sending scores to the central score database 606. The scores from other game systems may be displayed on the display 604.

Such a configuration may enable similar game systems to consolidate scores so that patron's scores may be compared with each other, no matter which game system was used to generate the score. Such a configuration may enable a championship or other organized contest to be staged with two, three, or more game systems.

Embodiment 600 may have the several game systems 602, 608, and 610 located near each other, such as in a fun center or arcade. The game systems 602, 608, and 610 may be located remotely and connected via the Internet to each other and the central score database 606. In such a configuration, a contest may be staged across a state or country with multiple patrons on multiple game systems able to compete against each other. In some such uses, a contest may be organized with a prize for the best score.

The central score database 606 may have a web interface 612 that may enable various users to interface with the database 606. In an administrator mode, the web interface 612 may enable a manager to check the status of the various game systems, determine the number of uses, identify any problems with the systems, or perform other activities. Such activities may also include various accounting functions that may measure the amount of revenue from each system, the uptime of each system, the number of different users, or other information.

The web interface 612 may enable a patron to gather information about the game systems, including the top scores from each system, rankings of the various patrons, view a history of the patron's scores, purchase future uses of the system, enter information about themselves as a patron, or any other use.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a path having an entrance and exit;
   a plurality of lasers oriented across at least a portion of said path to form a plurality of beams, each of said beams comprising at least one laser sensor;
   said system being adapted to:
   illuminate said lasers;
   detect when said beams are broken and turn off said lasers when said beams are broken; and
   determine a score.

2. The system of claim 1 further adapted to:
   receive a start input;
   begin a timer based on said start input;
   receive a stop input; and
   stop said timer based on said stop input to generate a time.

3. The system of claim 2, said stop input and said start input being generated by a single device.

4. The system of claim 2, said score being based at least in part on said time.

5. The system of claim 1, said score comprising a timer score and a penalty based on said beams being broken.

6. The system of claim 1, said system being further adapted to operate a secondary device based on an event.

7. The system of claim 6, said secondary device creating an audio sound.

8. The system of claim 6, said secondary device creating a visual effect.

9. The system of claim 6, said event comprising breaking at least one of said beams.

10. The system of claim 1, said system being further adapted to:

detect that a beam corresponding to a first laser has been broken; and turn off said first laser based on said first laser having been broken.

11. The system of claim 10, said system being further adapted to:

turn on said first laser after a predetermined time period has elapsed.

12. The system of claim 1 further comprising a secondary sensor located between said entrance and said exit along said path.

13. The system of claim 1, said entrance being the same as said exit.

14. The system of claim 1, said system being further adapted to illuminate at least one of said lasers based on said starting timer input.

15. The system of claim 1, said controller being further adapted to illuminate at least one of said lasers based on a timer.

16. The system of claim 1, at least one of said beams being formed by reflecting said laser by at least one mirror.

17. A method comprising:

determine a path, said path having an entrance and an exit;

installing a plurality of lasers to form beams across at least a portion of said path;

for each of said plurality of lasers, installing a sensor adapted to receive said laser to detect a tripped beam; and connecting said laser sensors and said lasers to a controller, said controller being adapted to:

start a timer based on a starting input;

illuminate a plurality of said lasers;

receive a laser input from said sensors for each of said lasers;

determine when a first laser beam has been broken and turn off said first laser beam;

stopping a timer based on a stopping input; and calculate a score based on said timer and a penalty value calculated from said tripped beam.

18. The method of claim 17 further comprising:

connecting said controller to at least one of a group composed of an audio generator, a light, a timer display, a fog generator, and an input switch.

19. The method of claim 17 further comprising:

installing at least one mirror between said laser and said sensor to form a reflected beam.

20. The method of claim 17, a first set of lasers being a first color and a second set of lasers being a second color.

* * * * *